United States Patent [19]

Czech et al.

[11] 4,128,935
[45] Dec. 12, 1978

[54] ASSEMBLY METHOD FOR A MOTOR

[75] Inventors: James I. Czech, Stevensville; Ernest B. Ruble, South Haven, both of Mich.

[73] Assignee: Whirlpool Corporation, Benton Harbor, Mich.

[21] Appl. No.: 867,093

[22] Filed: Jan. 5, 1978

[51] Int. Cl.² .......................................... H02K 15/00
[52] U.S. Cl. ...................................... 29/596; 29/732; 310/42; 310/43
[58] Field of Search ...................... 29/596, 598, 732; 310/42, 43, 89

[56] References Cited

U.S. PATENT DOCUMENTS

| 3,165,816 | 1/1965 | Thompson et al. | 29/596 |
| 3,484,934 | 12/1969 | Wightman | 29/596 |

Primary Examiner—Carl E. Hall

Attorney, Agent, or Firm—Wegner, Stellman, McCord, Wiles & Wood

[57] ABSTRACT

A method of assembling an electric motor in which a rigid first end bell is provided with a bearing seat in which is positioned a bearing. Then a rotor shaft for the motor is positioned in the bearing, and the end bell and rotor assembly is fixed in a holding fixture including a plurality of spaced shims, for further assembly steps. The shims extend upwardly through the first end bell and are spaced therefrom and from the motor shaft. Next a stator is placed on the first end bell with the shims extending therethrough. The end bell and stator are dimensioned such that a gap is established between them when assembled. Then a curable epoxy fluid resin is placed in the gap. Next a second end bell and second bearing held thereby is placed over the rotor shaft and a force applied to the end bell to force tabs on the second bell into the fluid epoxy resin. Finally the epoxy resin is cured to a solid and the end bells are mechanically secured together.

8 Claims, 6 Drawing Figures

U.S. Patent  Dec. 12, 1978  4,128,935
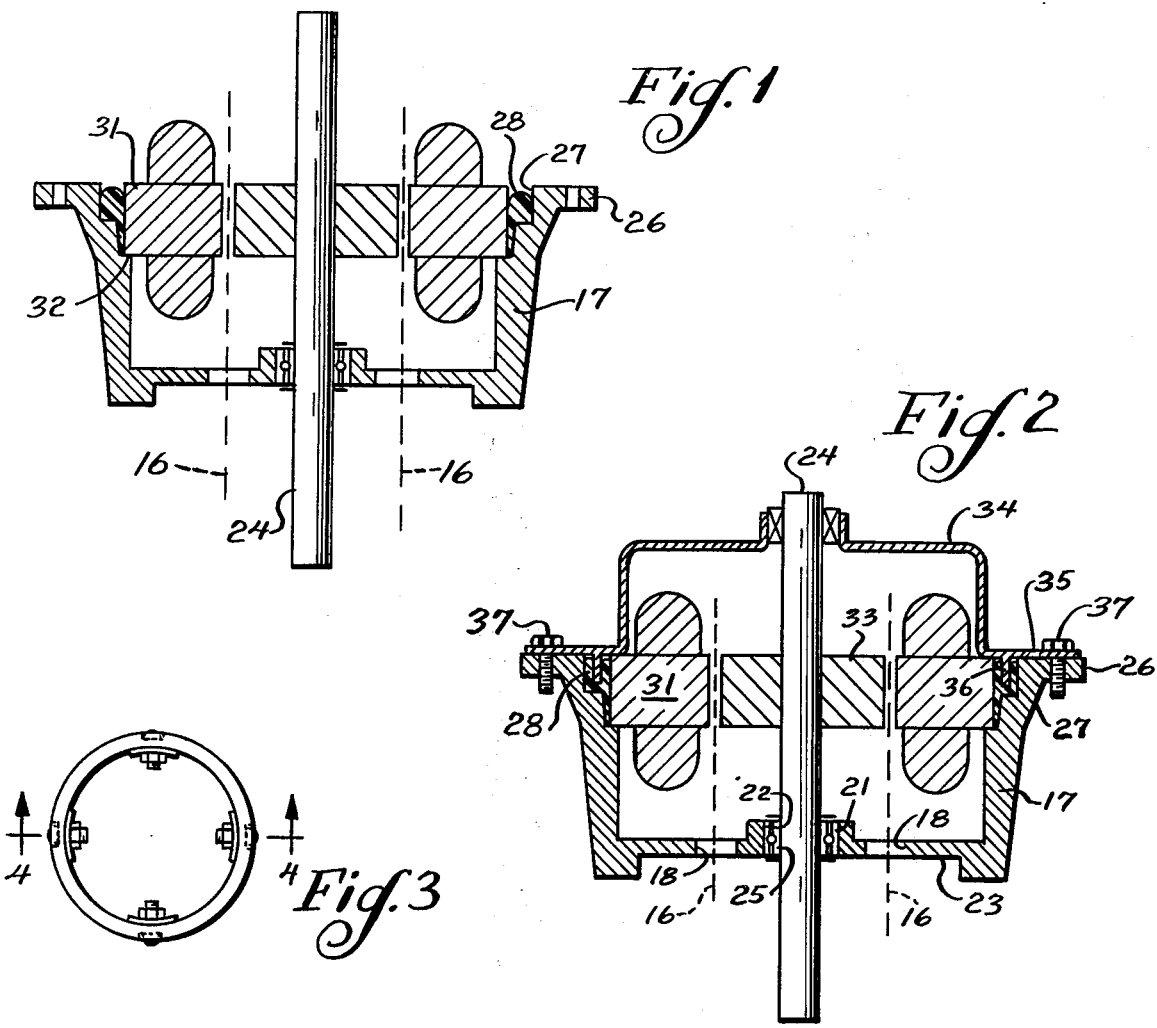
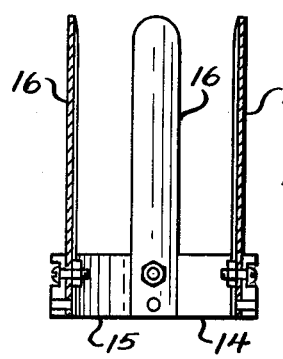
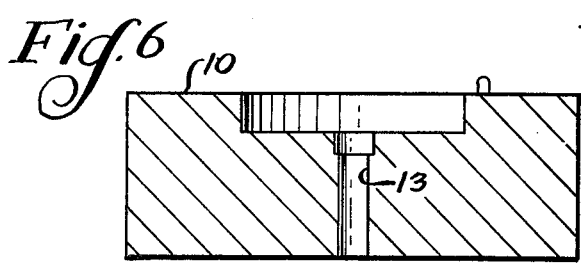
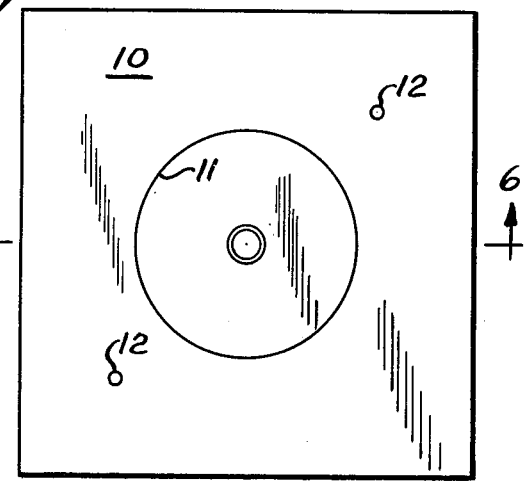

ASSEMBLY METHOD FOR A MOTOR

BACKGROUND OF THE INVENTION

A feature of this invention is to provide a method of assembling an electric motor which permits the accurate positioning of the stator relative to the rotor and to the motor shaft and which permits the efficient use of a curable epoxy resin in securing the motor parts together. The resin is not cured until the assembly of rigid first end bell, stator, rotor, shaft and second end bell is complete and firmly held after which the resin is activated and the contacting peripheral portions of the second end bells are secured together as by a pair of diametrically opposite fasteners such as screws or clips.

The prior art considered in preparing this application consisted of the following U.S. Pat. Nos. 3,165,816; 3,176,172; 3,437,853; 2,819,417 and 3,482,125.

SUMMARY OF THE INVENTION

The method of this invention permits the accurate positioning of the stator core relative to the rotor outside diameter while greatly reducing the required subsequent handling which often causes the end bells or caps to loosen and sometimes drop off in ordinary assembly methods. An important requirement of this invention is to use an epoxy resin in a fluid state to position the stator core inside diameter with respect to the rotor core outside diameter and, after curing to a solid state, to prevent changing relative positions in subsequent handling. Thus the placing of the epoxy resin into a gap between the stator core and an end cap or bell fixes the air gap which is preliminarily established by spacing shims extending between the rotor and the stator.

Then, while the end bells are in contact with each other at their peripheries and the tabs on the sheet metal end bells are forced into the epoxy resin in the gap, the resin is cured to a solid rigid state and the end bells are fastened together at these peripheral edge portions, which by now are in contact with each other, by fastening means such as a pair of diametrically opposite fastening screws.

After the epoxy resin has been cured and hardened the assembled motor is removed from the fixture and from the air gap shims and is then ready for testing or other desired operations.

BRIEF DESCRIPTION OF THE DRAWINGS

FIG. 1 is a vertical sectional view through a subassembly of a motor in the process of being assembled by the method of this invention.

FIG. 2 is a vertical sectional view similar to FIG. 1 showing further steps in the method.

FIG. 3 is a plan view of a shim assembly used in the method of this invention.

FIG. 4 is a vertical sectional view taken substantially along line 4—4 of FIG. 3.

FIG. 5 is a plan view of an assembly block of the holding fixture.

FIG. 6 is a vertical sectional view taken substantially along line 6—6 of FIG. 5.

DESCRIPTION OF THE PREFERRED EMBODIMENT

In the method of this invention as illustrated in the accompanying drawings there is provided an assembly block 10 as a part of an assembly fixture with this block having a circular recess 11 at its center and a pair of oppositely located positioning pins 12. The block 10 is also provided with a central vertical opening 13.

During the assembling a shim assembly 14 comprising a circular base 15 and four parallel shims 16 attached to the base 15 and extending upwardly in parallel is fixed on the block 10 in recess 11. The shims 16 are indicated in FIGS. 1 and 2 by broken lines.

When assembling the motor, a first bearing 21 is fit into a machined bearing seat 22 in a first end bell 17.

Next a motor shaft and rotor assembly 24 consisting of a shaft 25 and a rotor 33 is positioned in the bearing 21 located in seat 22. Now the assembled end bell and rotor are placed on the assembly fixture with the shaft 24 extending into the opening 13 in the assembly block 10.

In the first end bell 17 at the inner portion of the radial flange 26 there is provided a step which forms a gap 27 when the stator is in place as illustrated in FIG. 1.

Next, also as illustrated in FIG. 1, the stator 31 for the motor is placed in end bell 17 and supported by a circular inner shoulder 32. Then an epoxy resin 28 in a fluid state so as to be easily deformable is positioned in the gap 28 between the end bell flange 26 and the stator 31. The epoxy can be of the type disclosed in the above U.S. Pat. Nos. 3,165,816 and 3,482,125. The rotor 33 is now located within the inner diameter of the stator 31 and the stator is automatically positioned at the proper distance from the rotor by the spacing shims 16.

Next a sheet metal second end bell 34 having a self-aligning bearing 38 is placed on the motor assembly with shaft 25 positioned within bearing 38. End bell 34 has a radially extending outer flange 35 adapted to engage in surface contact the flange 26 on the first end bell as shown in FIG. 2. The end bell 34 is provided with projecting tabs 36 on the flange 35 at substantially right angles thereto and the two flanges 26 and 35 are pressed together by applying a force of five to ten pounds on a cap 39 of end bell 34 at the approximate axial center line of shaft 25 to project the tabs 36 into the still fluid epoxy 28.

As the end bells are pressed together it is desirable to avoid putting any substantial compression forces on the stator laminations during the epoxy cure period, since such forces could cause the stator to cock and bind the shims 16. To this end, the end bell 17 may be designed to allow a small clearance between end bell 34 and the laminations of stator 31 as at 40 of FIG. 1.

With the motor assembled in the fixture as shown in FIG. 2, the rotor and shaft assembly 24 becomes the reference to which the other parts of the motor assembly are aligned. For example, end bell 17 with its bearing 21 aligns with assembly 24 through the connection between Shaft 25 and bearing 21. Stator 31 aligns to assembly 24 through contact with the shims 16 and is allowed to float in the epoxy. When end bell 34 is put in place, self-aligning bearing 38 aligns with assembly 24, and allows end bell 34 to be mated with end bell 17 without distorting alignment of the other parts.

While the assembly is retained in the fixture with all the parts in their assembled relationship as shown in FIG. 2 the epoxy is cured to a solid state, fixing the parts in alignment. After this the attaching members such as the screws 37 are applied. In the illustrated embodiment there are two of these screws 37 located diametrically opposite to each other and each extending through both end bell flanges 26 and 35. Only two screws are used so as not to create distorting forces which might occur if the end bells did not mate evenly and additional screws were tightened between the end bells. At the conclusion of this assembling the motor is removed from the fixture.

The epoxy may be applied at spaced apart locations or all around the stator. We have found that four equally spaced locations gives good results.

We claim:

1. The method of assembling an electric motor, comprising:
    providing a rigid first end bell; forming a bearing seat in said first end bell; positioning a bearing in said bearing seat;
    fixing said first end bell with said bearing therein in a holding fixture; positioning and securing against axial movement a rotor shaft for said motor in the bearing;
    placing a plurality of spaced air gap producing shims adjacent the outer diameter of the rotor core;
    placing a stator for said motor over and enclosing the shims with the stator resting on said first end bell;
    providing a gap between said stator and first end bell;
    placing curable epoxy fluid resin in said gap;
    placing a second end bell and second bearing held by said second end bell over the end of the rotor shaft that is opposite to said first end bell and with said shaft extending into said second bearing, said second end bell having been previously provided with projecting tabs arranged to enter said gap, said tabs being located adjacent to an outer peripheral edge portion of said second end bell;
    forcing said tabs into said epoxy resin and said peripheral portion of said sheet metal stamping in contact with said first end bell;
    curing said epoxy resin while retaining the assembly of end bells, rotor, stator and bearings; and
    mechanically securing said end bells together.

2. The method of claim 1 wherein said rigid end bell comprises a casting and said bearing seat is formed by machining.

3. The method of claim 1 wherein said air gap shims are supported by said fixture while the stator is supported by the first end bell.

4. The method of claim 1 wherein said first end bell comprises a rigid cup-shaped unit having a base and sides extending therefrom that extend upright during said assembling for ease of assembly.

5. The method of claim 1 wherein there is provided a plurality of spaced gaps around said first end bell and said epoxy resin is added at said gaps.

6. The method of claim 1 wherein said end bells are provided with contacting peripheral edge portions at which said bells are attached together.

7. The method of claim 6 wherein said end bells are attached together by two substantially diametrically opposite fasteners after the epoxy resin has cured to a solid state.

8. The method of assembling an electric motor, comprising:
    providing a rigid first end bell comprising a casting;
    machining a bearing seat in said first end bell;
    positioning and fixing a bearing in said bearing seat;
    securing said first end bell with said bearing therein in a holding fixture;
    positioning and securing against axial movement a rotor shaft for said motor in the bearing;
    placing a plurality of spaced air gap producing shims on the motor; placing a stator for the motor over and enclosing the shims with the stator resting on said first end bell, said first end bell comprising a rigid cup-shaped unit having a base and sides extending therefrom that extend upright during the assembling of the motor for ease of assembly;
    providing four equally spaced gaps between the stator and the first end bell;
    placing a heat curable epoxy fluid resin in said gaps;
    placing a sheet metal stamping second end bell and second bearing held by said second end bell over the end of said rotor shaft that is opposite to said first end bell and with said shaft extending through and held by said second bearing, said second end bell stamping having been previously provided with projecting tabs spaced similarly to said gaps, said first and second end bells each having a radially projecting peripheral edge and the tabs being located at said peripheral edge of said second end bell;
    forcing said tabs in said epoxy resin and said peripheral portions of said end bells into firm contact;
    heat curing said epoxy resin to a solid while retaining the assembly of said end bells, rotor, stator and bearings; and
    securing said end bells together by two substantially diametrically opposite screws engaging said peripheral edge portions of said bells after the epoxy resin has been thusly cured to said solid state.

* * * * *